(12) United States Patent
Ohlsson

(10) Patent No.: US 9,108,272 B2
(45) Date of Patent: Aug. 18, 2015

(54) CONTROLLING RULES AND VARIABLES FOR CUTTING

(75) Inventor: Magnus Norberg Ohlsson, Vara (SE)

(73) Assignee: Tomologic AB, Stockholm (SE)

( * ) Notice: Subject to any disclaimer, the term of this patent is extended or adjusted under 35 U.S.C. 154(b) by 588 days.

(21) Appl. No.: 13/500,075

(22) PCT Filed: Oct. 8, 2009

(86) PCT No.: PCT/EP2009/063122
§ 371 (c)(1),
(2), (4) Date: Apr. 4, 2012

(87) PCT Pub. No.: WO2011/042058
PCT Pub. Date: Apr. 14, 2011

(65) Prior Publication Data
US 2012/0192690 A1    Aug. 2, 2012

(51) Int. Cl.
*B26D 1/00*    (2006.01)
*B23K 26/38*    (2014.01)

(52) U.S. Cl.
CPC ............... *B23K 26/38* (2013.01); *Y10T 83/04* (2015.04); *Y10T 83/849* (2015.04)

(58) Field of Classification Search
CPC .. B23K 26/38; G05B 19/408; G05B 19/4097; G05B 19/414; G05B 19/4093; G05B 19/40937; G05B 19/182; G05B 19/186; G05B 19/401; G05B 19/4103; G05B 19/41; G05B 19/19; G05B 19/4099; G05B 2219/50336; G05B 2219/34098; B23D 59/008; B44B 3/009; G03F 7/70725
USPC ............. 700/186, 187, 159, 160, 32, 171, 97, 700/36; 83/56, 49, 32
See application file for complete search history.

(56) References Cited

U.S. PATENT DOCUMENTS 5,214,590 A * 5/1993 Schnetzer ...................... 700/171
5,526,272 A * 6/1996 Kondo et al. .................. 700/178
(Continued)

FOREIGN PATENT DOCUMENTS

DE   101 29 751   1/2002
EP   1 563 940    8/2005
(Continued)

OTHER PUBLICATIONS

Hiroaki et al. JPH09285886 (machine translation), cover page + pp. 1-20.*

(Continued)

*Primary Examiner* — Darrin Dunn
*Assistant Examiner* — Derrick Boateng
(74) *Attorney, Agent, or Firm* — Morgan, Lewis & Bockius LLP

(57) ABSTRACT

The present invention relates to a method and a system for machine cutting several parts out of a piece of material using a beam cutting technology. The invention provides a set of controlling rules and variables for cutting two dimensional shapes or patterns. One rule or a combination of several rules are used for the cutting operation depending on the shape or pattern to be cut, the shape or pattern forming the parts out of the piece of material. The present invention specifically teaches that the set of controlling rules comprises rules for the forming of a cluster of parts with free form shapes, the parts being positioned so close to each other so that only the thickness of one cut made by the cutting beam is found between adjacent parts whenever the shape of the parts allows it.

41 Claims, 3 Drawing Sheets

(56) References Cited

U.S. PATENT DOCUMENTS

| | | |
|---|---|---|
| 5,777,294 A | 7/1998 | Sugahara et al. |
| 6,455,807 B1 | 9/2002 | Scott |
| 7,490,501 B2 * | 2/2009 | Endo .............................. 72/333 |
| 8,010,224 B2 * | 8/2011 | Yamaguchi et al. .......... 700/173 |
| 2003/0222058 A1 | 12/2003 | Yamazaki et al. |
| 2009/0108792 A1 * | 4/2009 | Fagan .......................... 700/187 |

FOREIGN PATENT DOCUMENTS

| | | |
|---|---|---|
| GB | 2 189 179 | 10/1987 |
| GB | 2 189 179 A | 10/1987 |
| JP | S63-104791 A | 5/1988 |
| JP | S63-115687 A | 5/1988 |
| JP | H05-224722 A | 9/1993 |
| JP | H06-190576 A | 7/1994 |
| JP | H08-206856 A | 8/1996 |
| JP | H09-285886 A | 11/1997 |
| JP | 2000-218467 A | 8/2000 |
| JP | 2004-009054 A | 1/2004 |
| JP | 2005-014009 A | 1/2005 |
| JP | 2008-290135 A | 12/2008 |

OTHER PUBLICATIONS

Shigetaka et al. JPH05224722 (machine translation), cover page + pp. 1-4.*
English translation of Japanese Office Action dated Jul. 8, 2014, for corresponding Japanese Patent Application No. 2012-532465.
International Search Report for PCT/EP2009/063122 dated Jan. 29, 2010.

* cited by examiner

CONTROLLING RULES AND VARIABLES FOR CUTTING

RELATED APPLICATIONS

The present application is a U.S. National Phase Application of International Application No. PCT/EP2009/063122 (filed 8 Oct. 2009).

FIELD OF INVENTION

The present invention relates to a method for machine cutting several parts out of a piece of material using a beam cutting technology, the method providing a set of controlling rules and variables for cutting two dimensional shapes or patterns, where one rule or a combination of several rules are used for the cutting operation depending on the shape or pattern to be cut, the shape or pattern forming the parts out of the piece of material.

The present invention also relates to a system and to a computer program product through which the inventive method can be implemented.

There are various cutting technologies known to cut parts out of a piece of material and the present invention relates to what here is called beam cutting technology. Beam cutting is defined as having some kind of beam as the cutting agent, such as laser cutting, plasma cutting, ion beam cutting, flame or torch cutting, water cutting, pellet cutting or air cutting. This is not to be confused with mechanical cutting where the cutting agent is a mechanical member such as a cutting blade or a rotating cutting head.

DESCRIPTION OF BACKGROUND ART

It is previously known to use a work plan optimization tool based on nesting part placement methods to place out the parts that are to be cut out of a piece of material. Nesting is a geometry optimization tool working in two dimensions that is based on different heuristic search algorithms that rotate and pack polygons in a given work area. In a graphic way nested work plans gives a quite good solution but in production it is required that a safe distance is used between parts. Safe distances have to take into account the machining and material technical conditions that arise in the production process. The size of the safe distance varies depending on used material and used cutting technology, a normal safe distance between parts is 5-20 mm.

Examples of used controlling rules for controlling the cutting operation of a machine are how to handle:
sharp edges,
turning points,
beam breaking in critical areas,
sensing the cutting head,
take into account of the grid which materials can be located at,
take into account the pivot risk of pre-cut details,
length and angle of lead in,
length and angle of lead out,
micro joint for parts, and
different use of gas when cutting and volume of abstractive material in water cutting.

Examples of controlling rules related to used material can be:
rolling direction for different metal,
heat,
that the material settles,
different patterns in the material,
material stretch,
tolerances for parts, and
part quality.

Due to the above mentioned production and material elated conditions there will be waste material between the cut parts.

As the beam makes the cut in the material the thickness of the cut is the same as, or corresponds to, the thickness of the beam, hence the beam thickness has to be taken into consideration when positioning the parts on the material and setting the safe distance between the parts. It is known to use tool radius compensation in the cutting process, where left tool radius compensation is used if the cut is made to the left of the part in the cutting direction, and right tool radius compensation is used if the cut is made to the right of the part in the cutting direction. Whenever the tool radius compensation is changed, the cutting process is stopped, the beam is turned off, and a new piercing is made.

Some known technologies that are used to provide a reliable production process is to use micro joints between a part and the material surrounding the part, normally called the material skeleton. A micro joint is created by stopping the cutting beam in a cut along a cutting path, moving the cutting device a small distance along the cutting path, and then starting the cutting beam again to continue the cut along the cutting path. The small uncut part will then constitute the micro joint.

In order to minimize the number of piercings and positioning distance in the cutting process it is known to manually position bridges between parts and to chain cut.

It is also known to minimize material waste by using common cut for straight lines between two points in order to minimize material waste and cutting length. In a common cut the distance between the two parts is only the thickness of one cut made by the cutting beam and no tool radius compensation is used during the cutting process.

SUMMARY OF THE PRESENT INVENTION

Problems

With any kind of beam cutting technology there is a huge problem with waste. A normal production reliable cutting plan has 20-50 percent waste. The background to why the wastage incurred in production is the ineffective methods for part placement on the raw material in combination with technology rules for each cutting method and each material.

When cutting technology is used as production method there are four different costs that bring the detail price. Material costs, which normally is significantly more than 50 percent of the detail price, and three different categories of machine costs; piercings, position distance and cutting distance. It is a problem to bring down the amount of waste material. It is also a problem to limit the number of piercings that are required in a cutting process and it is a problem to optimize the position distances and the cutting distances in the cutting process.

It is a problem to minimize the distance between free shaped parts in order to minimize the waste material.

If parts are positioned very close to each other, it is also a problem to keep the number of piercings to a minimum, to provide turning areas for the beam cutting process and to avoid that parts will pivot if there is no neighboring skeleton that the part can be joined to.

In beam cutting techniques it is a problem that the cutting beam lags behind from the upper surface of the material to the bottom surface of the material in the relative movement between the cutting device and the material. This means that if the machine stops the movement and turns the beam of then the material will not have been cut totally through in the end point of the cut.

Another problem is that if the cutting movement stands still with the beam turned on to catch up this lag, then the properties of the material in the area around the stopping point will be affected, for instance might the material be heated and hardened with some cutting technologies. The same is true at the starting point of a new cut where the piercing of the material will create a crater with a radius of material with affected properties around this starting point. Because of these problems so called lead ins and lead outs are sometimes used at the start point and end point of each cut, where the lead in and lead out is outside the actual cut so that this area of affected material will not be a part of the cut part.

Solution

With the purpose of solving one or more of the above indicated problems, and from the standpoint of the above indicated field of invention, the present invention teaches that the set of controlling rules comprises rules for the forming of a cluster of parts with free form shapes, where the parts are positioned so close to each other so that only the thickness of one cut made by the cutting beam is found between adjacent parts whenever the shape of the parts allows it.

This will reduce waste material and it will optimize the position distances and the cutting distances in the cutting process.

The present invention teaches that the set of controlling rules comprises rules for the joining together of the parts in the duster by micro joints holding adjacent parts together with each other. It is specifically taught that a micro joint is made by starting the cut of a contour a set distance into the contour to be cut, or by stopping the cut of a contour a set distance before the end of the contour to be cut, thus not closing the complete cut of the contour, where the uncut beginning or end of the contour constitute the micro joint and the size of the hereby made micro joint corresponds to the set distance. This will allow the making of micro joints without having to start and stop the cutting beam during the cutting process, which will give a cutting process with fewer starts and stops of the cutting beam. By doing this the cluster of parts that are connected to each other by means of micro joints can be treated as one complex part in the cutting process.

It is also proposed that the set of controlling rules comprises rules for separating the parts within the cluster and joining the parts with the material surrounding the cluster by micro joints holding the parts together with the surrounding material. Also this micro joint is made by starting the cut of a contour a set distance into the contour to be cut, or by stopping the cut of a contour a set distance before the end of the contour to be cut, thus not closing the complete cut of the contour, where the uncut beginning or end of the contour constitute the micro joint and the size of the hereby made micro joint corresponds to the set distance. This might be more advantageous if the cluster of parts only includes a small number of parts that are all easily connected to the surrounding material.

It is proposed that the size of the micro joints is controlled through the controlling rules, where those variables for controlling the size are depending on the set distance, used material and used cutting device.

Tool radius compensation is sometimes required to maintain the wanted distance between neighbouring parts and if the wanted quality of cut part requires tool radius compensation. With the purpose of limiting the number of piercings and thereto belonging lead ins and lead outs, and with the purpose of enabling complex combinations of parts belonging to one cluster, it is proposed that the set of controlling rules comprises rules for switching between right tool radius compensation, left tool radius compensation and no tool radius compensation during a continuous cut of a line or contour without turn-off and turn-on of the cutting beam.

For the same reason it is also proposed that the set of controlling rules comprises rules for the creation of strategically positioned turning areas by making a split cut for this purpose or by cutting a line or contour longer then necessarily required, and using the hereby created gap as a turning area.

The use of such gap as a turning area is done by allowing the cutting beam to catch up with used cutting device in the turning area, meaning that the lag of the cutting beam can be eliminated in the turning area, allowing a straight cutting beam as the cutting beam has changed direction and continues its cut in the new direction.

This will make sure that as the machine turns the cutting beam into another direction the cut will be complete all through the material even in the turning point, without leaving unwanted bridging material between adjacent materials in the turning point.

It is also proposed that the set of controlling rules comprises rules for allowing the cutting beam to catch up with used cutting device in an interception point as the cutting beam crosses the interception point.

As several parts positioned close to each other, there will, depending on their form, sometimes be required the cutting of very small angles. These small angles can be formed by two straight cuts, by two tangents or curves, or by a combination of a straight cut and a curve leading into the angle. There is technical problem to cut small angles and the present invention proposes that the set of controlling rules comprises a rule for cutting small angles, said rule stating that a small angle is cut in two cuts, one cut for each line leading into the angle, and each cut leading into the tip of the angle.

The forming of a cluster of parts positioned very close to each other will sometimes require that thin stripes is cut out of the material, and the present invention teaches that when the distance between two cuts is so small that the properties of the material between the two cuts can be affected and start struggle, respective cut is made in two partial cuts, and thereby minimizing the problem with affected material in thin parts. These partial cuts are started from the outer parts of respective cut towards the centre of respective cut.

It is also proposed that the partial cuts are not made all the way along respective cut, but that a micro joint is left between the two partial cuts, thus providing support for the thin part with the neighbouring part.

If the parts of the cluster are joined together by micro joints, it is proposed that the cluster of parts is cut totally free from surrounding material or material between parts not belonging to any part.

In order to further minimize the waste material, it is proposed that, whenever two or more clusters are cut from one piece of material, at least two different variables are used to set the distance between neighbouring parts from two different clusters. A first variable representing a first smallest distance between neighbouring parts with bordering parallel lines, and a second variable representing a second smallest distance between neighbouring parts where at least one of the neighbouring parts has a bordering tangent, where the distance represented by the second variable is shorter than the distance represented by the first variable since two parallel cuts will affect the material of the neighbouring part more than a cut with a tangent.

It is also proposed that the second distance, represented by the second variable, is dependant on the radius of the tangent, where a smaller radius will allow a shorter smallest distance.

It is also possible to provide a third variable representing a third smallest distance between neighbouring parts where at least one of the neighbouring parts has a bordering corner, where the third distance, represented by the third variable, is shorter than the distances represented by the first and second variables.

It should be understood that the implementation of these rules depend on used beam cutting technology and used material, thus it is proposed that a fourth variable is representing used material, and that a fifth variable is representing used beam cutting technology, such as cutting with plasma, laser, flame, water, ions, torch, pellets or air, so that these variables can be taken into account when applying the rules in a certain cutting operation.

Different cutting technologies will provide cutting beams with different thickness, and different cutting devices using the same cutting technologies will also provide cutting beams with different thickness depending on the conditions of the cutting device. Hence it is proposed that a sixth variable is representing the width or thickness of the cutting beam. This sixth variable is also depending on the fourth and fifth variable.

The present invention teaches that the set of controlling rules may provide rules for a lead in or lead out by means of automatic angle adjustment and length adjustment for the lead in or lead out, depending on used material, the thickness of the used material and used cutting technology, the angle and length adjustment being adapted to position the start and stop point of the cut sufficiently far away from the cut and with a lead in or lead out angle that is as small as possible.

The present invention proposes that the cutting operation is performed in the following sequence:
  cut all holes, strategically positioned split cuts and common cuts,
  cut all pockets created between clusters or parts, and
  cut the outer contour of the cluster.

It should be understood that the inventive method can be implemented as a tool for computer aided manufacturing (CAM), computer aided design (CAD), or as a part of the controlling rules and variables used by a numerical controller in cutting equipment controlled by means of computer numerical control (CNC).

The present invention also relates to a system for machine cutting several parts out of a piece of material, comprising a beam cutting device and a control unit for controlling the beam cutting device adapted to perform the control according to the inventive method.

The present invention also relates to a computer program product comprising computer program code, which when executed enables a computer to implement the controlling rules and variables according to the inventive method.

Advantages

The advantages of a method, system, a computer program product according to the present invention are that through the invention it is possible to minimize the material waste and create a production reliable cutting plan with optimized machine cost, meaning an optimization regarding the number of piercings, position distances and cutting distances.

The present invention provides an optimal cutting with a cutting work plan where it is possible to control the cutting variables in the cutting machine to get a reliable process. The invention provides control over turning areas, distance between parts, micro joints between parts, when clustering together more than one free formed part, length and angle of lead in, length and angle of lead out, switching between tool radius compensations, and scanning within the cluster area, that is the possibility to use the sensing cutting head and without lifting the head between holes, splits, common cuts, and pockets within the cluster area, to minimize the positioning distances.

The provided production reliability means a safe process, right tolerance for parts, and an optimal quality for parts with minimum resource waste.

This present invention provides the possibility to create clusters for free form parts. Single parts optimized on the work area in close clusters provide a chance to minimize the material waste. As clusters are created details are positioned against each other which make it possible to use all tangent segments when clustering. The inventive cluster of several parts creates a new part without safe distance only tangents, splits, bridges, turning areas, micro joints, common cut lines and pockets. Different constellations of the inventive rules and variables provides the possibility to give a reliable cutting process for any kind of upcoming situation when free formed two dimensional parts are going to be clustered without safe distance.

The use of micro joints between the parts to be cut instead of between the parts and the skeleton also gives advantages in the manual or automated sorting process.

The use of inventive turning areas will also provide the possibility to avoid using areas of the skeleton for changing the cutting direction and instead use already cut lines where the cutting direction is changed, which again minimize the waste.

BRIEF DESCRIPTION OF THE DRAWINGS

A method, a system and a computer program product according to the present invention will now be described in detail with reference to the accompanying drawings, in which.

DESCRIPTION OF EMBODIMENTS AS PRESENTLY PREFERRED

Figure 1:
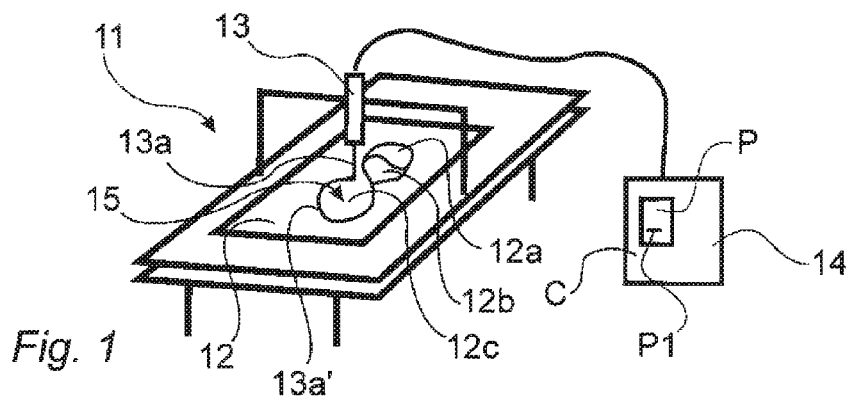
FIG. 1 is a schematic and simplified illustration of a method, system and computer program product according to the present invention.

The present invention will now be described with reference to FIG. 1 illustrating a method for machine cutting several parts 12*a*, 12*b*, 12*c* out of a piece of material 12 using a beam cutting technology. The schematic illustration of FIG. 1 shows that a cutting device 13 is movable and the material 12 is fixed, however, it should be understood that the present invention can also be implemented in a system where the cutting device is fixed and the material is movable. The invention relates to controlling the relative movement between the material 12 and the cutting device 13 regardless of what is moving and what is fixed.

In the description of the present invention certain terminology might be used that implies that one specific beam cutting technology is described, but it should be understood that the present invention relates to any beam cutting technology and the skilled person will understand how a feature described with a terminology specific for one beam cutting technology can be adapted and implemented in another beam cutting technology.

The inventive method provides a set of controlling rules and variables for cutting two dimensional shapes or patterns, where one rule or a combination of several rules are used for the cutting operation depending on the shape or pattern to be cut, where the shape or pattern forms the parts out of the piece of material. The controlling rules and parameters are used to control the relative movement between a cutting device 13 and the piece of material 12 so that this movement is performed in a controlled manner to perform the cutting operation.

It is specifically taught that the set of controlling rules comprises rules for the forming of a cluster of parts 15 with free form shapes. By free form shapes is meant that the parts could have any form or shape in the two dimensions that are cut out of the material.

The present invention teaches that the parts 12*a*, 12*b*, 12*c* are positioned so close to each other so that only the thickness 13*a*' of the cutting beam 13*a* is found between adjacent parts whenever the shape of the parts allows it.

This means that a common cut will be required between parts where the common line to be cut is not a straight line between two points, rather it could be any curved form, or several connected straight lines.

The different embodiments presented in the following description shows examples of where parts with different forms or shapes can be cut without any required skeleton between the parts, thus saving a lot of material.

Figure 2:
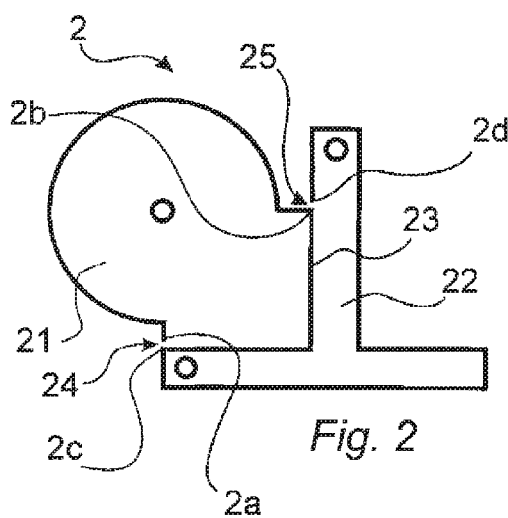
FIG. 2 is a schematic illustration of a cluster of parts with only two parts.

One example is illustrated in FIG. 2 where a first part 21 and a second part 22 are positioned so close so that only the thickness of one cut 23 made by the cutting beam is found between the parts 21, 22.

Figure 5:
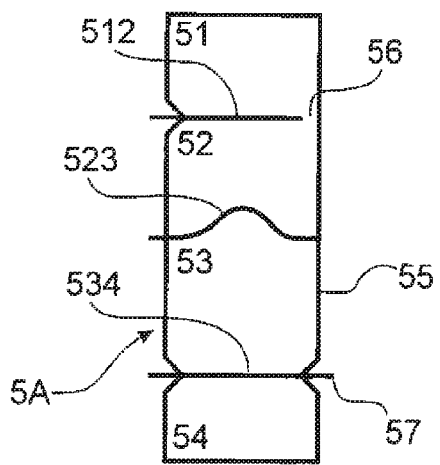
FIG. 5 is a schematic and simplified illustration of how a common cut can end in order to achieve different means.

It is proposed that the set of controlling rules comprises rules for the making of micro joints for the joining together of said parts by micro joints holding adjacent parts together with each other, and that a micro joint is made by starting the cut of a contour a set distance into the contour to be cut, or by stopping the cut of a contour a set distance before the end of the contour to be cut, thus not closing the complete cut of the contour, which will be shown in more detail with reference to FIG. 5. The size of the hereby made micro joint corresponds to said set distance It shall be understood that the set of controlling rules may also comprise rules for separating the parts within the cluster and joining the parts with the material surrounding the cluster by micro joints holding the parts together with the surrounding material, which is illustrated in FIG. 2 showing a first micro joint 24 and a second micro joint 25 is joining the parts 21, 22 with the surrounding material 2.

As can be seen in FIG. 2 the first micro joint 24 is made by starting the cut of the contour a set distance into the contour to be cut, and the second micro joint 25 is made by stopping the cut of the contour a set distance before the end of the contour to be cut, thus not closing the complete cut of the contour, where the size of the hereby made micro joints 24, 25 corresponds to the set distance.

It should be understood that depending on the thickness of the material, micro joints might not be required at all, since the cut parts will stick to the skeleton and neighbouring parts when the material is thick enough without the risk of tilting for small parts.

The size of the micro joints is controlled through the controlling rules, and variables for controlling the size are depending on the set distance, used material and used cutting device. If for instance the combination of cutting technology and material causes a lag of the beam then the cut can be made almost all the way to another cut part where the beam is turned off, and where the thicker joint on the back of the material due to beam lag is a part of the micro joint. If the combination of cutting technology and material does not cause any lag of the beam, then the micro joints can be cut to precise size.

If the first and second part 21, 22 requires tool radius compensation, the present invention teaches that when starting to cut in point 2*a*, left tool radius compensation is used for cutting the contour of the first part 21 to the point 2*b* where the common cut starts. From point 2*b* to the point 2*c*, during the common out part of the contour, no tool radius compensation is used, and from point 2*c* to point 2*d*, right tool radius compensation is used for cutting the contour of the second part 22. It is thus proposed that the set of controlling rules comprises rules for switching between right tool radius compensation, left tool radius compensation and no tool radius compensation during a continuous cut of a line or contour without turn-off and turn-on of the cutting beam. This means that cutting the two parts 21, 22 in FIG. 2 can be done in one continuous cut from point 2*a* to point 2*d*. The figure also shows how micro joints 24, 25 are formed by not completing the cut all the way.

FIG. 2 is an illustration of a very simple and also specific embodiment of the present invention since the cluster of parts only includes two parts.

Figure 3:
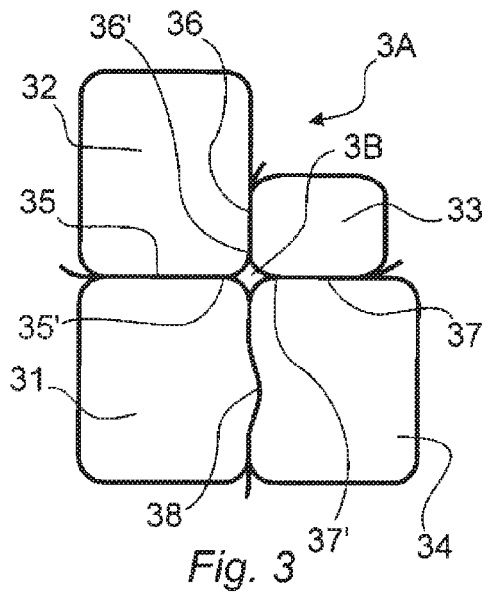
FIG. 3 is a schematic illustration of a cluster with several parts.

FIG. 3 is another example of a cluster 3A with four parts, a first 31, second 32, third 33, and fourth 34 part. Here it can be seen that the cut parts creates a pocket 3B in the middle between the four parts since the four parts have round corners.

The present invention teaches that the set of controlling rules comprises rules for the creation of strategically positioned turning areas by making a split cut for this purpose or by cutting a line or contour longer then necessarily required, and using the hereby created gap as a turning area.

In FIG. 3 it is proposed that the common cuts between three of the parts are cut first, for instance first the first common cut 35 between the first and second part 31, 32, and then the second common cut 36 between the second and third part 32, 33, and then third common cut 37 between the third and fourth part 33, 34. These three common cuts 35, 36, 37 are cut into the pocket 3B in the middle, thereby creating three turning areas, a first turning area 35', a second turning area 36', and a third turning area 37 at the end of respective common cut.

As the fourth common cut 38 is cut, the pocket in the middle is made by the same cut, where the three turning areas 35', 36', 37' allows the beam to enter into the turning area, turn around and then continue out of the turning area, cutting the next corner, and continue into the next turning area, and so on around the whole pocket 3B.

The embodiment according to FIG. 3 is also an example where change of tool radius compensation might be required during the cut. To exemplify this it is shown that as the fourth common cut 38 is made no tool radius compensation is used during the cut between the first part 31 and the fourth part 34, this is then changed into left tool radius compensation while cutting the round corner of the fourth part 34, while turning in the third turning area 37', while cutting the round corner of the third part 33, while turning in the second turning area 36', while cutting the round corner of the second part 32, while turning in the first turning area 35', and while cutting the round corner of the first part 31.

The use of the gap as a turning area is done by allowing the cutting beam to catch up with used cutting device in the turning area.

The beam can be is allowed to catch up with the cutting device in different ways and which way to choose depends on the specific cutting situation.

One way allow the beam to catch up with the cutting device is to allow the cutting speed to slow down within the turning area and accelerate to normal cutting speed as the cutting operation proceeds out of the turning area. The tight turning area will in practical applications of the invention cause the cutting speed to slow down as turns within the turning area is made, thereby allowing the beam to catch up with the culling device as the turn is made in the turning area. In some applications, depending on reliability and/or quality requirements, it might be required to actively slow down, or even stop, the movement in the cutting process in order to make sure that the beam really is allowed to catch up.

Another way to allow the beam to catch up with the cutting device is by allowing the cutting device to do a radius within the turning area.

Another way to allow the beam to catch up with the cutting device is by allowing the cutting device to do an angle or phase within the turning area.

Figure 4:
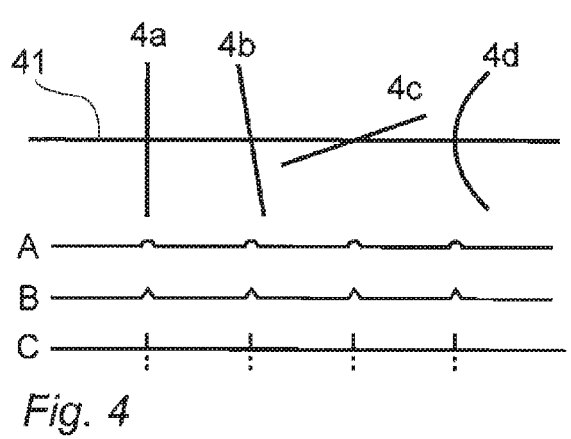
FIG. 4 is a schematic illustration of how to cut over several interception points.

FIG. 4 shows an embodiment of the present invention where the cutting beam 41 crosses several already cut lines 4a, 4b, 4c, 4d, or interception points. This could cause a problem if the beam is lagging behind the cutting device, since the upper part of the beam might start to cut on the other side of the interception point before the lower part of the beam has cut through the first side of the interception point, which might be a risk of cutting interruption.

In order to prevent this the present invention teaches that the set of controlling rules comprises rules for allowing the cutting beam to catch up with used cutting device in an interception point as the cutting beam crosses the interception point.

This catching up can be done in different ways, three different proposed ways are to let the cutting device do a little radius A within the cut gap, to let the cutting device do a little phase B in the cut gap, or to slow down the cutting speed when entering the gap and then start to cut with normal speed when exiting the gap C.

FIG. 5 shows an example of how cuts can be ended in different way in order to achieve different features of the present invention. The figure shows schematically a first part 51, a second part 52, a third part 53 and a fourth part 54 belonging to a cluster of parts 5A, the whole cluster not shown in the figure.

The parts are positioned so that a first cut 512 between the first part 51 and the second part 52 is a common cut, a second cut 523 between the second part 52 and the third part 53 is a common cut, and a third cut 534 between the third part 53 and the fourth part 54 is a common cut, and all four parts border to an outer cut 55.

Here it can be seen that the first cut 512 has been stopped before reaching the outer cut 55, thus forming a micro joint 56 between the first part 51 and the second part 52.

It can also be seen that the second cut 523 has been cut all the way to the outer cut 55, thus separating the second and third parts 52, 53 from each other.

It can also be seen that the third cut 534 has been cut over the outer cut, thus providing a strategically positioned cut that can be used as a turning area 57.

Figure 6:
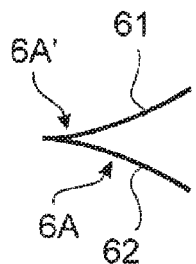
FIG. 6 is a schematic and simplified illustration of how to cut small angles.

FIG. 6 illustrates how the present invention proposes a solution regarding cutting small angles 6A. The present invention teaches that the set of controlling rules comprises a rule stating that a small angle 6A is cut in two cuts, a first cut 61 and a second cut 62, one cut for each line leading into the angle 6A, and each cut leading into the tip 6A' of the angle 6A. In the figure, the angle is exemplified by two curves leading into each other, however, it should be understood that it might also be two straight lines, or one straight line and one curve, leading into each other.

Figure 7A:
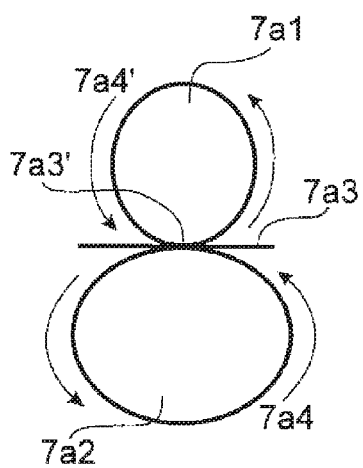
FIGS. 7a and 7b is a schematic illustration of two different ways of cutting out two parts with neighbouring tangents at a distance of the thickness of one cut made by the cutting beam.

FIG. 7a shows an example where a first part 7a1 and a second part 7a2 is positioned so that the distance between the neighbouring tangents is only the thickness of one cut made by the cutting beam. In FIG. 7a the cutting operation is started by cutting a strategically positioned split cut 7a3 through the common tangent of the first and second part 7a1, 7a2. After that the two parts 7a1, 7a2 are cut in one cut where the cutting beam will use the strategically positioned split cut 7a3 as a turning area 7a3'. In this cut no change of radius compensation is required since the cut direction 7a4, 7a4' is such that the radius compensation remains the same during the whole cut.

Figure 7B:
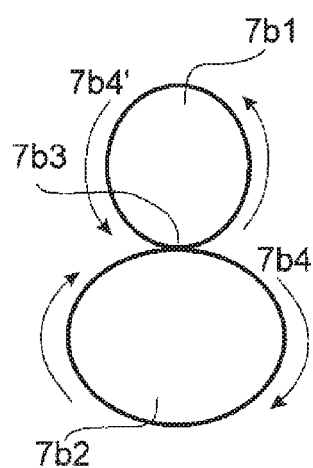

FIG. 7b also shows an example where a first part 7b1 and a second part 7b2 is positioned so that the distance between the neighbouring tangents is only the thickness of one cut made by the cutting beam. In FIG. 7b the two parts 7b1, 7b2 are cut in one cut where the cutting beam will cross the already cut tangent point 7b3 as the cutting beam cuts through this point the second time, the already cut tangent point 7b3 thus being an interception point according to FIG. 4. If there are requirements of tool radius compensation, this can be provided by a change of radius compensation as the cutting beam moves from cutting the first part 7b1 into cutting the second part 7b2 and vice versa since the cut direction 7b4, 7b4' is such that the radius compensation changes as the cutting beam goes through the tangent point 7b3.

Figure 8:
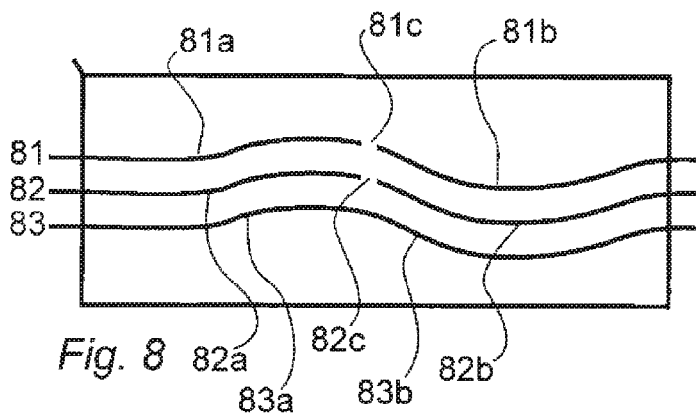
FIG. 8 is a schematic illustration of how to cut thin strips.

FIG. 8 illustrates that when the distance between three cuts, a first cut 81, a second cut 82 and a third cut 83, is so small that the properties of the material between two neighbouring cuts is affected and start struggle, the present invention proposes that the first, second and third cuts 81, 82, 83 are made in two partial cuts 81a, 81b, 82a, 82b, 83a, 83b starting from the outer parts of respective cut 81, 82, 83 towards the centre of respective cut 81, 82, 83.

FIG. 8 also shows that the first and second partial cuts 81a, 81b, 82a, 82b are not made all the way along respective cut 81, 82, but that a micro joint 81c, 82c is left between the two partial cuts 81a, 81b, 82a, 82b, while the third partial cuts 83a, 83b, are made all the way to close the contour of the third cut 83.

It is proposed that it is possible to se the cluster of parts as one single complex part, where the cluster of parts is cut totally free from surrounding material or material between parts not belonging to any part, in which case the parts in the duster might, if required, be joined together by micro joints and the duster is totally free from the surrounding skeleton material.

The present invention teaches that different variables are available for the control of the cutting device.

Figure 9:
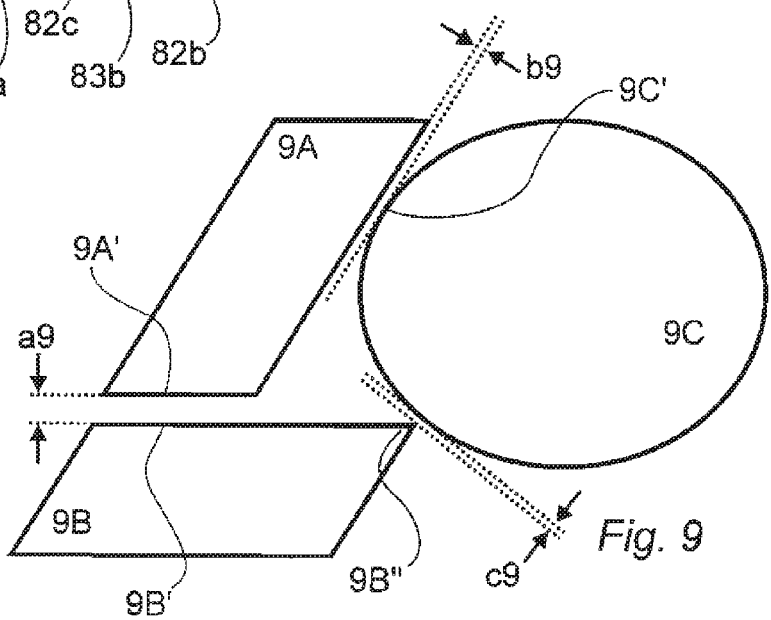
FIG. 9 is a schematic illustration of how distances between different clusters can be set.

FIG. 9 illustrates that two or more dusters 9A, 9B, 9C are cut from one piece of material. The dusters can comprise several different parts but for the sake of simplicity the dusters 9A, 9B, 9C are only schematically illustrated as solid parts. At least two different variables are used to set the distance between neighbouring parts from two different dusters. A first variable represents a first smallest distance a9 between neighbouring parts 9A, 9B with bordering parallel lines 9A', 9B'. A second variable represents a second smallest distance b9 between neighbouring parts 9A, 9C where at least one of the neighbouring parts 9C has a bordering tangent 9C'. The present invention teaches that the distance b9 represented by the second variable is shorter than the distance a9 represented by the first variable.

The present invention also teaches that the second distance b9, represented by the second variable, is dependant on the radius of the tangent 9C'.

FIG. 9 also shows that a third variable can represent a third smallest distance c9 between neighbouring parts 9B, 9C, where at least one of the neighbouring parts 9B has a bordering corner 9B'', where the third distance c9, represented by the third variable, is shorter than the distances a9, b9 represented by the first and second variables.

It is proposed that a fourth variable is representing used material, and that a fifth variable is representing used beam cutting technology, such as cutting with plasma, laser, flame, water, ions, torch, pellets or air.

It is also proposed that a sixth variable is representing the width of the cutting beam, which is depending on the fourth and fifth variable.

Figure 10:
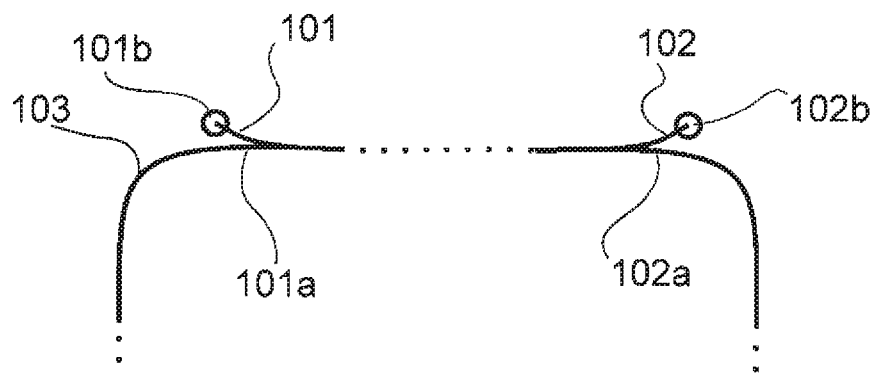
FIG. 10 is a schematic illustration of how to set lead ins and lead outs.

FIG. 10 shows that a lead in 101 or lead out 102 can be provided by means of automatic angle adjustment and length adjustment for the lead 101 in or lead out 102, depending on used material, the thickness of the used material and used cutting technology.

It is proposed that the angle 101a, 102a is chosen as small as possible in relation to the cut 103 so that the crater 101b created by the piercing as the cutting beam is started in the lead in 101, or affected zone 102b that is created as the beam is stopped in the lead out 102, will be positioned outside of the cut 103, while still minimizing the length of the lead 101 in and lead out 102 respectively.

Figure 11:
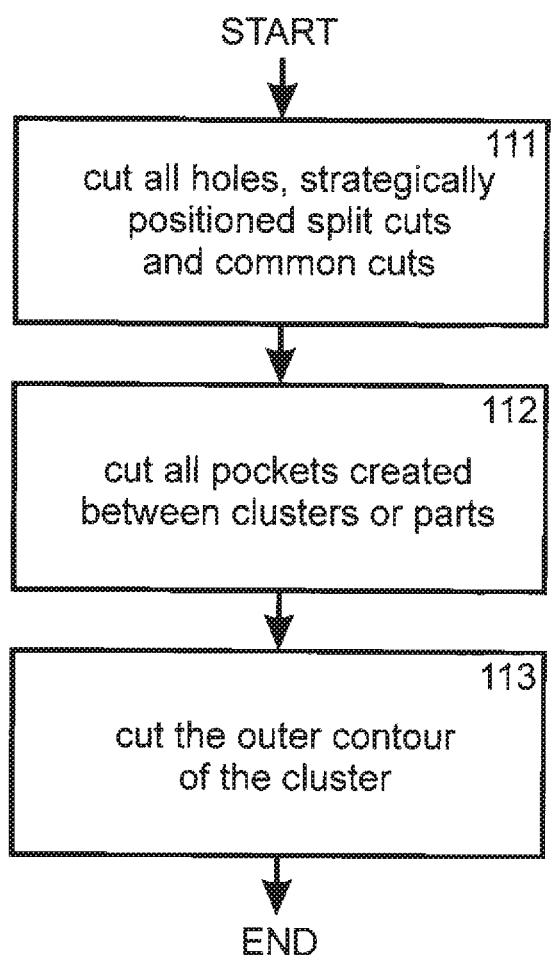
FIG. 11 is a flow chart illustrating a sequence of cutting operations.

FIG. 11 is a simplified flow chart showing a proposed sequence of performing the cutting operation:
 cut all holes, strategically positioned split cuts and common cuts 111,
 cut all pockets created between clusters or parts 112, and
 cut the outer contour of the cluster 113.

The first operation 111 is to cut all holes, strategically positioned split cuts and common cuts, and this is done first to create required turning areas and it can easily be done since the piece of material is still a stable piece since all parts are still connected to each other and to the skeleton while performing these operations. Cuts, splits and common cuts are all adapted to any micro joints that are positioned to connect the different parts in the cluster.

The second operation 112 is to cut all pockets created between clusters or parts, and this can easily be done since the piece of material is still a stable piece since all parts are still connected to each other and to the skeleton while performing these operations.

The third and last operation 113 is to cut the outer contour of the cluster, and as this is done, all parts will be released from the skeleton and only be connected to each other by means of any micro joints created during the process. It should be understood that if an embodiment is used where micro joints are connecting the parts of the cluster with the skeleton instead of with each other, the micro joints are created while cutting the outer contour.

It should be understood that a method according to the present invention can be implemented as a tool for computer aided manufacturing (CAM), computer aided design (CAD), or as a part of the controlling rules and variables used by a numerical controller in cutting equipment controlled by means of computer numerical control (CNC).

The present invention also relates to a system which will be described with renewed reference to FIG. 1, being a system 11 for machine cutting several parts 12a, 12b, 12c out of a piece of material 12, the inventive system 11 comprising a beam cutting device 13 and a control unit 14 for controlling the beam cutting device 13.

The control unit 14 is adapted to follow a set of controlling rules for cutting two dimensional shapes or patterns, where one rule or a combination of several rules can be used for the cutting operation depending on the shape or pattern to be cut, which shape or pattern is forming the parts 12a, 12b, 12c out of the piece of material 12.

The present invention specifically teaches that the control unit 14 is adapted to follow a set of controlling rules comprising rules for the forming of a cluster 15 of parts 12a, 12b, 12c with free form shapes, where the parts 12a, 12b, 12c are positioned so close to each other so that only the thickness 13a' of the cutting beam 13a is found between adjacent parts whenever the shape of the parts allows it.

It is proposed that the control unit is adapted to control the cutting device into leaving micro joints between adjacent parts, thus allowing the micro joints to hold adjacent parts together with each other, where the control unit is adapted to control the cutting device into starting the cut of a contour a set distance into the contour to be cut, or, as shown in FIG. 5, into stopping the cut of a contour 512 a set distance before the end of the contour to be cut, whereby the cutting device is controlled into not closing the complete cut of the contour, thus providing a micro joint 56 joining the first part 51 and the second part 52, where the size of the micro joint corresponds to the set distance.

As illustrated in FIG. 2, it is proposed that the control unit is adapted to control the cutting device into leaving micro joints 24, 25 between the parts 21, 22, and the material 2 surrounding the cluster thus allowing the micro joints 24, 25 to hold the parts 21, 22 together with the surrounding material.

The control unit is adapted to follow controlling rules setting the size of the micro joints, and variables for controlling the size are depending on used material and used cutting device.

It is proposed that the control unit is adapted to control the cutting device into switching between right tool radius compensation, left tool radius compensation and no tool radius compensation during a continuous cut of a line or contour without having to cut a new hole. FIG. 2 illustrates this by showing that when starting to cut in point 2a, left tool radius compensation is used for cutting the contour of the first part 21 to the point 2b. Where the common cut starts, from point 2b to the point 2c, during the common cut part of the contour, no tool radius compensation is used, and from point 2c to point 2d, right tool radius compensation is used for cutting the contour of the second part 22.

As illustrated in FIG. 3, it is proposed that the control unit is adapted to control the cutting device into creating strategically positioned turning areas 35', 36', 37' by making a split cut for this purpose or by cutting a line or contour longer then necessarily required, and controlling the cutting device into using the hereby created gap as a turning area.

The control unit is adapted to control the cutting device into using the gap as a turning area by controlling the cutting device so that the cutting beam is allowed to catch up with the culling device in the turning area.

The catching up of the beam can be provided in different ways. It is possible to adapt the control unit to control the cutting operation into slowing down the cutting speed within the cut gap and accelerate to normal cutting speed as the cutting operation is started on the other side of the gap. A natural cause of the tight turning point in the turning area is that the cutting speed is slowed down as the turn is made, however, in some applications, depending on reliability and/or quality requirements, it might be required to actively slow down, or even stop, the movement in the cutting process in order to make sure that the beam really is allowed to catch up.

The control unit can also be adapted to control the cutting device into doing a radius within the cut gap, or into doing an angle or phase within the cut gap.

In the same way, the control unit can be adapted to control the cutting device into allowing the cutting beam to catch up with used cutting device in an interception point as the cutting beam crosses the interception point.

As shown in FIG. 6 it is proposed that the control unit is adapted to control the cutting device into cutting small angles 6A in two cuts, a first cut 61 and a second cut 62, one cut for each line leading into the angle 6A, and each cut 61, 62 leading into the tip 6A' of the angle 6A.

As shown in FIG. 8 it is proposed that when the distance between two cuts, a first cut 81 and second cut 82, is so small that the properties of the material between the two cuts 81, 82 is affected and start struggle, the control unit is adapted to control the cutting device into making respective cut 81, 82 in two partial cuts 81a, 81b, 82a, 82b starting from the outer parts of respective cut towards the centre of respective cut.

It is also proposed that the control unit is adapted to control the cutting device into not making the partial cuts 81a, 81b, 82a, 82b all the way along respective cut, but that a micro joint is left between said two partial cuts. Also a third cut 83 is shown where the two partial cuts 83a, 83b are made all the way to close the contour of the third cut 83 without leaving a micro joint.

It is also proposed that the control unit is adapted to control the cutting device into cutting the cluster of parts totally free from surrounding material or material between parts not belonging to any part.

FIG. 9 shows that whenever two or more clusters 9A, 9B, 9C are to be cut from one piece of material, it is proposed that the control unit is adapted to control the cutting device into using a first smallest distance a9 between neighbouring parts 9A, 9B with bordering parallel lines 9A', 9B', where this smallest distance a9 is represented by a first variable. A second smallest distance b9 between neighbouring parts 9A, 9C where at least one of the neighbouring parts has a bordering tangent 9C', this smallest distance b9 being represented by a second variable, where the second distance b9, being represented by the second variable, is shorter than the first distance a9, represented by the first variable.

The second distance b9, represented by the second variable, is dependant on the radius of the tangent 9C'.

It is also proposed that a third variable is adapted to represent a third smallest distance c9 between neighbouring parts 9B, 9C where at least one of the neighbouring parts 9B has a bordering corner 9B", where the third distance c9, represented by the third variable, is shorter than the distances a9, b9 represented by the first and second variables.

It is also proposed that the control unit is adapted to take into account a fourth variable representing used material, and a fifth variable representing used beam cutting technology, such as cutting with plasma, laser, flame, water, ions, torch, pellets or air.

It is also proposed that the control unit is adapted to take into account a sixth variable representing the width of the cutting beam, which is depending on the fourth and fifth variable.

FIG. 10 shows that the control unit is adapted to a provide lead in 101 or lead out 102 by means of automatic angle adjustment and length adjustment for said lead in 101 or lead out 102, depending on used material, the thickness of the used material and used cutting technology.

A control unit according to the present invention can be adapted to control the cutting device into performing the cutting operation in the following sequence as indicated by the flow chart of FIG. 11:
  cut all holes, strategically positioned split cuts and common cuts 111,
  cut all pockets created between clusters or parts 112, and
  cut the outer contour of the cluster 113.

An inventive system can be adapted to function as a tool for computer aided manufacturing (CAM) or computer aided design (CAD), and an inventive control unit can be a numerical controller in a computer numerical control (CNC) machine.

The present invention also relates to a computer program product P as schematically illustrated in FIG. 1, comprising computer program code P1, which when executed enables a computer C to implement the controlling rules and variables according to the inventive method.

It will be understood that the invention is not restricted to the aforedescribed and illustrated exemplifying embodiments thereof and that modifications can be made within the scope of the inventive concept as illustrated in the accompanying Claims.

The invention claimed is:

1. Method for machine cutting several parts out of a piece of material using a beam cutting technology, said method comprising:
    providing a set of controlling rules and variables for cutting two dimensional shapes or patterns, where one rule or a combination of several rules are used for the cutting operation depending on the shape or pattern to be cut, said shape or pattern forming said parts out of said piece of material,
    wherein said set of controlling rules comprises rules for the forming of a cluster of parts with free form shapes, said parts being positioned so close to each other so that only a gap made by one cut of the cutting beam is found between adjacent parts,
    wherein the shape of said parts allows said parts to be positioned so close to each other so that only the gap with the thickness of one cut made by the cutting beam is found between adjacent parts, and
    wherein said set of controlling rules comprises rules for the creation of strategically positioned turning areas by, through a common tangent of the adjacent parts, making a split cut or cutting a line or contour longer than necessarily required and using the gap between adjacent parts as a turning area.

2. Method according to claim 1, wherein said set of controlling rules comprises rules for the joining together of said parts by micro joints holding adjacent parts together with each other, and that a micro joint is made by starting the cut of a contour a set distance into the contour to be cut, or by stopping the cut of a contour a set distance before the end of the contour to be cut, thus not closing the complete cut of the contour, where the size of the hereby made micro joint corresponds to said set distance.

3. Method according to claim 1, wherein said set of controlling rules comprises rules for separating the parts within said cluster and joining the parts with the material surrounding said cluster by micro joints holding the parts together with the surrounding material, and that a micro joint is made by starting the cut of a contour a set distance into the contour to be cut, or by stopping the cut of a contour a set distance before the end of the contour to be cut, thus not closing the complete cut of the contour, where the size of the hereby made micro joint corresponds to said set distance.

4. Method according to claim 2 wherein the size of said micro joints is controlled through said controlling rules, and that variables for controlling said size are depending on said set distance, used material and used cutting device.

5. Method according to claim 1, wherein said set of controlling rules comprises rules for switching between right tool radius compensation, left tool radius compensation and no tool radius compensation during a continuous cut of a line or contour without turn-off and turn-on of the cutting beam.

6. Method according to claim 1, wherein the use of said gap as a turning area is done by allowing the cutting beam to catch up with used cutting device in said turning area.

7. Method according to claim 1, wherein said set of controlling rules comprises rules for allowing the cutting beam to catch up with used cutting device in an interception point as the cutting beam crosses said interception point.

8. Method according to claim 1, wherein said set of controlling rules comprises a rule for cutting small angles, said rule stating that a small angle is cut in two cuts, one cut for each line leading into the angle, and each cut leading into the tip of the angle.

9. Method according to claim 1, wherein when the distance between two cuts is so small that the properties of the material between the two cuts is affected and start struggle, respective cut is made in two partial cuts starting from the outer parts of said cut towards the centre of said cut.

10. Method according to claim 9, wherein said partial cuts are not made all the way along respective cut, but that a micro joint is left between said two partial cuts.

11. Method according to claim 1, including cutting said cluster of parts totally free from surrounding material or material between parts not belonging to any part.

12. Method according to claim 1, wherein whenever two or more clusters are cut from one piece of material, at least two different variables are used to set the distance between neighboring parts from two different clusters, a first variable representing a first smallest distance between neighboring parts with bordering parallel lines, and a second variable representing a second smallest distance between neighboring parts where at least one of said neighboring parts has a bordering tangent, where the distance represented by said second variable is shorter than the distance represented by said first variable.

13. Method according to claim 12, wherein the second distance, represented by said second variable, is dependent on the radius of said tangent.

14. Method according to claim 12, wherein a third variable represents a third smallest distance between neighboring parts where at least one of said neighboring parts has a bordering corner, where the third distance, represented by said third variable, is shorter than the distances represented by said first and second variables.

15. Method according to claim 14, wherein a fourth variable is representing used material, and that a fifth variable is representing used beam cutting technology, such as cutting with plasma, laser, flame, water, ions, torch, pellets or air.

16. Method according to claim 15, wherein a sixth variable is representing the width of said cutting beam, which is depending on said fourth and fifth variable.

17. Method according to claim 1, wherein providing a lead in or lead out by means of automatic angle adjustment and length adjustment for said lead in or lead out, depending on used material, the thickness of said used material and used cutting technology.

18. Method according to claim 1, including performing said cutting operation in the following sequence:
cut all holes, strategically positioned split cuts and common cuts,
cut all pockets created between clusters or parts, and
cut the outer contour of the cluster.

19. Method according to claim 1, wherein said method is implemented as a tool for computer aided manufacturing (CAM) or computer aided design (CAD).

20. Method according to claim 1, wherein said method is implemented as a part of the controlling rules and variables used by a numerical controller in cutting equipment controlled by means of computer numerical control (CNC).

21. System for machine cutting several parts out of a piece of material, comprising:
a beam cutting device; and
a control unit for controlling said beam cutting device, said control unit being adapted to follow a set of controlling rules for cutting two dimensional shapes or patterns, where one rule or a combination of several rules can be used for the cutting operation depending on the shape or pattern to be cut, said shape or pattern forming said parts out of said piece of material,
wherein said control unit is adapted to follow a set of controlling rules comprising rules for the forming of a cluster of parts with free form shapes, said parts being positioned so close to each other so that only a gap made by one cut of the cutting beam is found between adjacent parts,
wherein the shape of said parts allows said parts to be positioned so close to each other so that only the gap with the thickness of one cut made by the cutting beam is found between adjacent parts, and
wherein said control unit is adapted to control said cutting device into creating strategically positioned turning areas by, through a common tangent of the adjacent parts, making a split cut or cutting a line or contour longer than necessarily required and using the gap between adjacent parts as a turning area.

22. System according to claim 21, wherein said control unit is adapted to control said cutting device into leaving micro joints between adjacent parts, thus allowing said micro joints to hold adjacent parts together with each other, where said control unit is adapted to control said cutting device Into starting the cut of a contour a set distance into the contour to be cut, or into stopping the cut of a contour a set distance before the end of the contour to be cut, whereby the cutting device is controlled into not closing the complete cut of the contour, thus providing a micro joint with a size that corresponds to said set distance.

23. System according to claim 21, wherein said control unit is adapted to control said cutting device into separating the parts within said cluster and leaving micro joints between the parts and the material surrounding said cluster, thus allowing said micro joints to hold the parts together with the surrounding material, where said control unit is adapted to control said cutting device into starting the cut of a contour a set distance into the contour to be cut, or into stopping the cut of a contour a set distance before the end of the contour to be cut, whereby the cutting device is controlled into not closing the complete cut of the contour, thus providing a micro joint with a size that corresponds to said set distance.

24. System according to claim 22, wherein said control unit is adapted to follow controlling rules setting the size of said micro joints, and that variables for controlling said size are depending on said set distance, used material and used cutting device.

25. System according to claim 21, wherein said control unit is adapted to control said cutting device into switching between right tool radius compensation, left tool radius compensation and no tool radius compensation during a continuous cut of a line or contour without having to cut a new hole.

26. System according to claim 21, wherein said control unit is adapted to control said cutting device into using said gap as a turning area by controlling said cutting device so that the cutting beam is allowed to catch up with the cutting device in said turning area.

27. System according to claim 21, wherein said control unit is adapted to control said cutting device into allowing the cutting beam to catch up with used cutting device in an interception point as the cutting beam crosses said interception point.

28. System according to claim 21, wherein said control unit is adapted to control said cutting device into cutting small angles in two cuts, one cut for each line leading into the angle, and each cut leading into the tip of the angle.

29. System according to claim 21, wherein when the distance between two cuts is so small that the properties of the material between the two cuts is affected and start struggle, said control unit is adapted to control said cutting device into making respective cut in two partial cuts starting from the outer parts of said cut towards the centre of said cut.

30. System according to claim 29, wherein said control unit is adapted to control said cutting device into not making said partial cuts all the way along respective cut, but that a micro joint is left between said two partial cuts.

31. System according to claim 21, wherein said control unit is adapted to control said cutting device into cutting said cluster of parts totally free from surrounding material or material between parts not belonging to any part.

32. System according to claim 21, wherein whenever two or more clusters are to be cut from one piece of material, said control unit is adapted to control said cutting device into using a first smallest distance between neighboring parts with bordering parallel lines, said smallest distance being represented by a first variable, and using a second smallest distance between neighboring parts where at least one of said neighboring part has a bordering tangent, this smallest distance being represented by a second variable, where the second distance, represented by said second variable, is shorter than the first distance, represented by said first variable.

33. System according to claim 32, wherein the second distance, represented by said second variable, is dependent on the radius of said tangent.

34. System according to claim 32, wherein a third variable is adapted to represent a third smallest distance between neighboring parts where at least one of said neighboring parts has a bordering corner, where the third distance, represented by said third variable, is shorter than the distances represented by said first and second variables.

35. System according to claim 34, wherein said control unit is adapted to take into account a fourth variable representing used material, and a fifth variable representing used beam cutting technology, such as cutting with plasma, laser, flame, water, ions, torch, pellets or air.

36. System according to claim 35, wherein said control unit is adapted to take into account a sixth variable representing the width of said cutting beam, which is depending on said fourth and fifth variable.

37. System according to claim 21 wherein said control unit is adapted to a provide lead in or lead out by means of automatic angle adjustment and length adjustment for said lead in or lead out, depending on used material, the thickness of said used material and used cutting technology.

38. System according to claim 21 wherein said control unit is adapted to control said cutting device into performing said cutting operation in the following sequence:
  cut all holes, strategically positioned split cuts and common cuts,
  cut all pockets created between clusters or parts, and
  cut the outer contour of the cluster.

39. System according to claim 21 wherein said system is adapted to function as a tool for computer aided manufacturing (CAM) or computer aided design (CAD).

40. System according to claim 21 wherein said control unit is a numerical controller in a computer numerical control (CMC) machine.

41. A non-transient computer-readable medium comprising data representing coded instruction sets configured for execution by a processor in a computer, the instructions comprising:
  providing a set of controlling rules and variables for cutting two dimensional shapes or patterns, where one rule or a combination of several rules are used for the cutting operation depending on the shape or pattern to be cut, said shape or pattern forming said parts out of said piece of material,
  wherein said set of controlling rules comprises rules for the forming of a cluster of parts with free form shapes, said parts being positioned so close to each other so that only a gap made by one cut of the cutting beam is found between adjacent parts,
  wherein the shape of said parts allows said parts to be positioned so close to each other so that only the gap with the thickness of one cut made by the cutting beam is found between adjacent parts, and
  wherein said set of controlling rules comprises rules for the creation of strategically positioned turning areas by, through a common tangent of the adjacent parts, making a split cut or cutting a line or contour longer than necessarily required and using the gap between adjacent parts as a turning area.

* * * * *